(12) United States Patent
Franke et al.

(10) Patent No.: US 11,913,490 B2
(45) Date of Patent: Feb. 27, 2024

(54) SECURING MEANS AND SYSTEM FOR PRE-MOUNTING A PENCIL-SHAPED CONNECTING ELEMENT

(71) Applicant: HONSEL UMFORMTECHNIK GMBH, Froendenberg (DE)

(72) Inventors: Timo Franke, Ense (DE); Peter Kirchhoff, Ense (DE)

(73) Assignee: HONSEL UMFORMTECHNIK GMBH, Froendenberg (DE)

( * ) Notice: Subject to any disclaimer, the term of this patent is extended or adjusted under 35 U.S.C. 154(b) by 995 days.

(21) Appl. No.: 16/500,821

(22) PCT Filed: Apr. 5, 2018

(86) PCT No.: PCT/EP2018/058721
§ 371 (c)(1),
(2) Date: Oct. 4, 2019

(87) PCT Pub. No.: WO2018/185217
PCT Pub. Date: Oct. 11, 2018

(65) Prior Publication Data
US 2022/0307543 A1   Sep. 29, 2022

(30) Foreign Application Priority Data
Apr. 5, 2017 (DE) .................. 10 2017 107 353.1

(51) Int. Cl.
*F16B 41/00* (2006.01)

(52) U.S. Cl.
CPC .................. *F16B 41/002* (2013.01)

(58) Field of Classification Search
CPC ........................ F16B 41/002; F16B 21/086
USPC ............................... 411/900, 999, 901
See application file for complete search history.

(56) References Cited

U.S. PATENT DOCUMENTS

| 5,395,194 | A  | * | 3/1995  | Johnson ............ | F16B 41/002 411/970 |
| 5,778,608 | A  | * | 7/1998  | Elliott, Jr. ........ | B65D 88/76 52/741.12 |
| 6,280,132 | B1 | * | 8/2001  | Szczukowski ..... | F16B 5/0258 411/107 |
| 10,550,876 | B2 | * | 2/2020  | Slater ................ | F16B 41/002 |
| 2002/0159861 | A1 | * | 10/2002 | Genick, II ......... | F16B 41/002 411/353 |
| 2011/0286813 | A1 |  | 11/2011 | Szczukowski et al. | |

(Continued)

FOREIGN PATENT DOCUMENTS

| DE |    29804041 U1 * | 7/1999 | ............ F02F 7/006 |
| DE | 102005007807 A1 * | 7/2006 | ............ F02M 59/44 |
| DE | 10 2008 030 801 A1 | 12/2009 | |

(Continued)

*Primary Examiner* — Kimberly T Wood
(74) *Attorney, Agent, or Firm* — Norman B. Thot

(57) ABSTRACT

A securing device for a pre-assembly of a pin-shaped connecting element in a through-opening of a component The securing element includes a sleeve with and an inner side and with a flat outer wall having a recess arranged therein, and holding elements each of which protrude inwardly. The holding elements are arranged on the inner side of the sleeve. The recess is arranged into the flat outer wall of the sleeve and provides a latching engagement of a lug which is arranged in the through-opening during the pre-assembly.

13 Claims, 4 Drawing Sheets

(56) References Cited

U.S. PATENT DOCUMENTS

2012/0121362 A1    5/2012  Taylor et al.
2014/0161562 A1    6/2014  Dechant et al.

FOREIGN PATENT DOCUMENTS

DE    202010004644 U1 *   8/2010   ............ F16B 41/002
FR        2976987 A1 *  12/2012   ............ F16B 41/002

* cited by examiner

SECURING MEANS AND SYSTEM FOR PRE-MOUNTING A PENCIL-SHAPED CONNECTING ELEMENT

CROSS REFERENCE TO PRIOR APPLICATIONS

This application is a U.S. National Phase application under 35 U.S.C. § 371 of International Application No. PCT/EP2018/058721, filed on Apr. 5, 2018 and which claims benefit to German Patent Application No. 10 2017 107 353.1, filed on Apr. 5, 2017. The International Application was published in German on Oct. 11, 2018 as WO 2018/185217 A1 under PCT Article 21(2).

FIELD

The present invention relates to a securing device for the pre-assembly of a pin-shaped connecting element, in particular a screw, in a through-opening provided in a component. In order to support the connecting element, the securing device has a sleeve, in particular in the shape of a cylinder jacket, and a plurality of inwardly protruding holding elements on the inner side of the sleeve. The present invention also relates to a system consisting of such a securing device and of a component which is produced by injection molding or by diecasting and which has a through-bore.

BACKGROUND

U.S. Pat. No. 5,395,194 describes a securing device which is designed as a sleeve and has outwardly and inwardly arched portions in an alternating manner in the circumferential direction. The outwardly arched portions hold the securing device in a force-fitting manner in the bore while the inwardly facing portions hold an inserted screw in a force-fitting manner. So that the sleeve does not slip too deeply into the through-bore, the bore is provided with a step on which the front end side of the sleeve in the plugging-in direction is supported. The need for the step makes the production of the bore complicated.

DE 10 2009 016 633 A1 describes a similar securing device which, in addition to the inwardly protruding holding elements which hold the preassembled connecting element, additionally has further holding elements protruding outward at the two ends of the sleeve. The further holding elements are elastically deformable, and can therefore initially execute a deviating movement when the securing device is inserted into the through-bore. The outwardly protruding holding elements which engage behind the edges of the through-bore also prevent the securing device which is inserted in the through-bore from being displaced axially during the pre-assembly and during the later final assembly of the connecting element. In order to permit the engaging-behind action of the outwardly protruding holding elements, the through-bores in the components must be finished by machining in an additional working step.

DE 10 2008 030 801 A1 describes the axial securing of a screw to be mounted in a component. The axial securing comprises a ring element which, via latching lugs attached on the outside, engages behind a shoulder which is provided in the component and is specially dimensioned with respect to the ring element. The ring element is suitable only to a limited extent for the pre-assembly of a screw since the screw is not securely supported in the ring element. The provision of the specially dimensioned shoulder in the component also makes the insertion of the axial securing uncomfortable.

SUMMARY

An aspect of the present invention is to provide a securing device which can be manufactured simply and cost-effectively and with which the pre-assembled connecting element is held securely in the through-bore of the component. A further aspect of the present invention is to provide a system comprising a securing device of this type and a component which is provided with a through-bore and which can be produced in a simple manner.

In an embodiment, the present invention provides a securing device for a pre-assembly of a pin-shaped connecting element in a through-opening of a component. The securing element includes a sleeve comprising and an inner side and a flat outer wall which comprises a recess arranged therein, and a plurality of holding elements each of which are configured to be inwardly protruding. The plurality of holding elements are arranged on the inner side of the sleeve. The recess is arranged into the flat outer wall of the sleeve and is configured to provide a latching engagement of a lug which is arranged in the through-opening during the pre-assembly.

BRIEF DESCRIPTION OF THE DRAWINGS

The present invention is described in greater detail below on the basis of embodiments and of the drawings in which.

DETAILED DESCRIPTION

Figure 1:
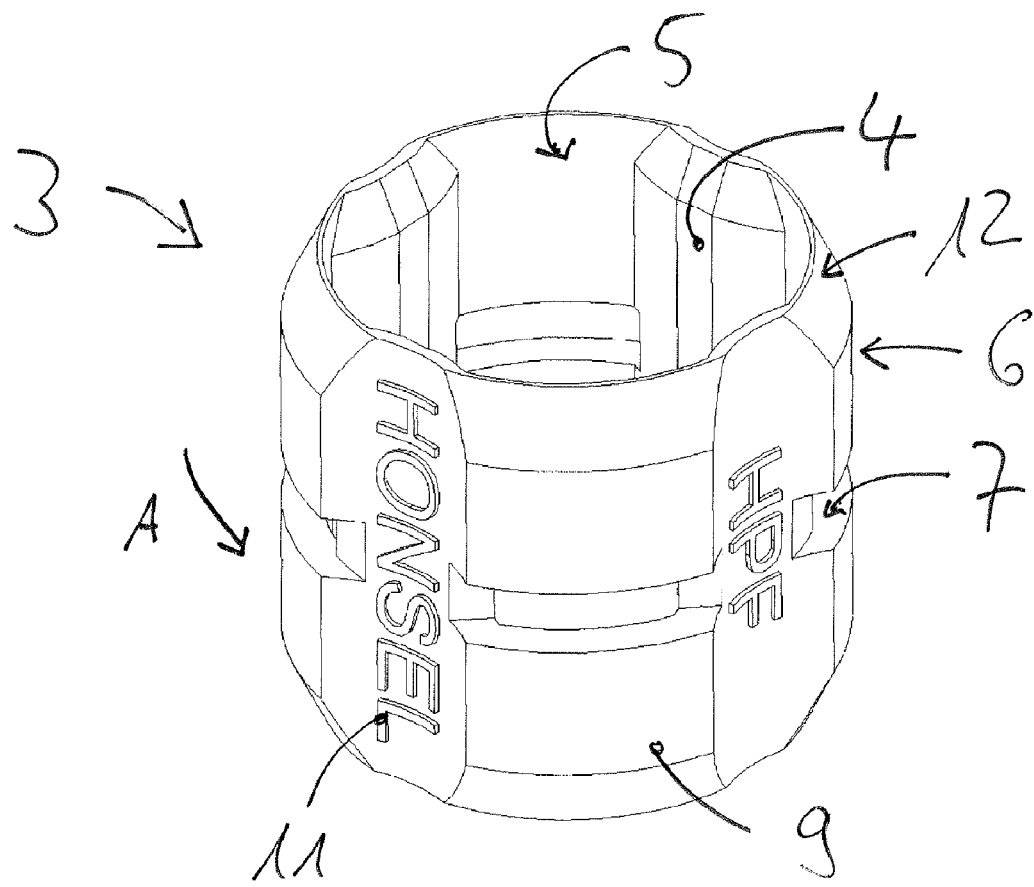
FIG. 1 shows a perspective view of a securing device.

The basic concept of the present invention lies in introducing a recess into the flat outer wall of the securing device, which is configured as a sleeve, so that a lug which is located in the through-opening or which remains during the production latches into the recess during the pre-assembly. The flat outer wall here extends over a large part of the length of the sleeve and has a substantially circular cross section which can, however, be interrupted in particular by the inwardly protruding holding elements. The sleeve is inserted into the through-opening of the component in contact with the flat outer wall. Such a flat outer wall enables the sleeve to be inserted without tilting with a large contact surface into the through-opening and is then securely held therein. The sleeve is accordingly in flat contact with the bore and does not lie only against a few holding points and/or the lug.

With the lug latched to such an extent into the recess, the securing device according to the present invention with the connecting elements plugged therein, in particular with the plugged-in screw, is secured against slipping axially out of the through-bore. In order to permit this function, the recess must be correspondingly configured so that it has a stop on both sides in each case in the axial direction. The recess is therefore advantageously designed as a slot running perpendicularly to the axis of the sleeve in the outer wall of the sleeve.

The special characteristic of the securing device according to the present invention is that it dispenses with outwardly and/or inwardly protruding latching lugs known from the prior art. This firstly reduces the risk of the formation of chips during pressing of the securing device into the through-bore. Secondly, by omission of inwardly protruding latching lugs, a secure and axially freely positionable support of the connecting elements can be provided.

An important aspect of the present invention is that it becomes possible with this configuration of the securing device to produce the through-bores in components in a particularly simple manner and to here dispense with a machine finishing. Finally, suitable components with pre-assembled connecting elements are components which are produced by diecasting or injection molding. In this case, through-bores are regularly formed by two core pullers which are pulled apart as they are removed from the mold. After the removal from the mold, an annular lug generally remains which, in the prior art, must be removed by a finishing step, for example, by drilling or punching. According to the present invention, however, the remaining annular lug is not removed, but is rather used in order to provide the securing device with support. It in principle suffices to use the shoulder which sometimes inevitably remains during production. It is, however, advantageous in respect of the securing device according to the present invention to configure the core pullers so that a defined, in particular annular, shoulder remains in the through-bore.

The present invention is accordingly also manifested in the use of the remaining shoulder and therefore in a system having a securing device with a recess according to the present invention and having a component which is produced by casting and which has at least one through-bore which is formed by two core pullers which, as they are being removed from the mold, leave behind an annular lug in the through-bore. The remaining annular lug then latches into the recess, in particular into the slot, wherein, in the case of a component made of plastic, in particular the annular lug, and in the case of a component made of metal, in particular the geometry of the sleeve, yields for the latching-in operation.

The sleeve according to the present invention can generally have a flat outer wall of any configuration. The outer wall can, for example, be angular or corrugated. In an embodiment, the sleeve can, for example, be in the shape of a cylinder jacket, wherein the recess is introduced into the outer wall of the cylinder jacket in the circumferential direction. The cylinder jacket advantageously has a circular cross section corresponding to the through-opening.

In an embodiment of the present invention, the securing device can, for example, have the basic shape described in U.S. Pat. No. 5,395,194 with inwardly arched portions ("inward arches") and outwardly arched portions ("outward arches") in an alternating manner in the circumferential direction, wherein the surfaces of the outward arches lie on an imaginary circle. The concave inward arches of the outer wall here form the inwardly protruding holding elements. The outward arches remain with respect to the imaginary circle to a certain extent in the outer wall of the sleeve. In order to provide production which is as simple as possible and good support of the connecting elements in the securing device and of the securing device in the through-bore, it is advantageous if the inward arches and the outward arches run over the entire height of the sleeve.

The inward arches reliably hold the connecting elements in any desired position by a force-fitting connection. This reliable support makes a pre-assembly of the connecting elements in the sleeve possible before the system made up of connecting elements and sleeve is plugged at a later time into the through-opening. Latching into the thread of a screw is avoided with the flat inward arches. Each screw is held independent of the position and securely via the force-fitting connection.

The surfaces which arise via the concave inward arches of the outer wall are appropriate for the attaching of an informative label, for example, the material, a nest labeling and/or a date. The advantage is that these surfaces do not come into contact with the bore wall, and that the risk of the formation of chips is therefore reduced.

In an embodiment of the present invention, the recess can, for example, be formed by a slot which runs with respect to the imaginary circle and traverses the outward arches on a corresponding circumference missing the inward arches. The slot is advantageously not only formed on the surface of the outer wall, but also penetrates the material thereof, and is therefore continuous. The securing device latches into the corresponding through-opening of the component due to the "partial" slots in the lateral surface of the sleeve. The securing device is thereby introduced captively into the through-opening.

In order to simplify the later feeding in and the pre-assembly, it is particularly advantageous to configure the securing device symmetrically with respect to the slot running over the circumference. For this purpose, the slot runs at a medium height and visually divides the sleeve into two identical parts. Via the central positioning of the slot, the securing device is plugged by at least up to ¼ into the bore before the latching-in function begins. The securing device is thereby guided securely, and a tilting during the application of the clipping-in force is therefore avoided.

The securing device or the sleeve can, depending on use, for example, either be injection molded or be diecast integrally from a plastic; the sleeve can also be manufactured from a metal. The securing device can thereby be produced cost-effectively in large numbers, with the particular shape of the securing device permitting production without subsequent finishing.

In order to increase the flexibility resulting from the shape of the sleeve and to therefore further simplify the clipping into the through-bore, it can be advantageous to slit the wall of the sleeve from one end to the other so that the diameter can be somewhat reduced in the event of pressure from the outside. Such a slot ideally has an axial orientation and is introduced in the region of an inward arch. The slot is advantageously already produced here during the casting of the sleeve and is not introduced subsequently.

The particular advantages of the securing device or of the sleeve shaped according to the present invention are also that a plugged-in connecting element, in particular a screw, can be moved axially with a defined force in the sleeve without the sleeve being pulled or pushed out of the bore. The screw can also be locked in any desired position. A particular characteristic of the geometry according to the present invention is also that the sleeve can be pressed individually into the bore with a defined force even without a screw. The form-fitting connection of the securing device in the component is increased via this special geometry.

A further advantage is that the securing device can be pre-assembled on the shank region of the screw and the pre-assembled "screw and sleeve connection" can be pressed into the bore in one working step.

Further features and advantages emerge from the description below under reference to the drawings.

Figure 2:
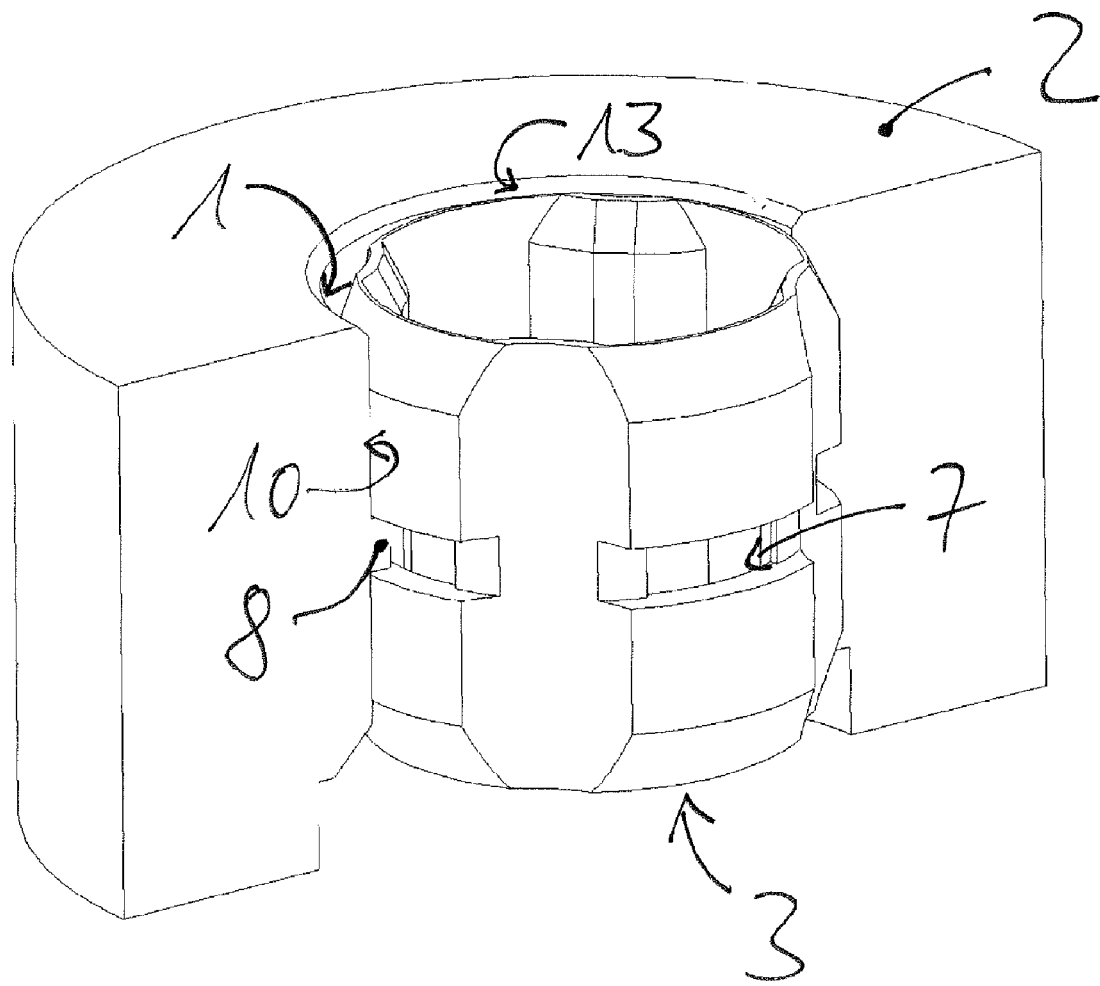
FIG. 2 shows a cross sectional view of a securing device in a through-bore of a component.

FIG. 1 shows a symmetrical securing device for the pre-assembly of a pin-shaped connecting element (not shown), in particular of a screw, in a through-opening 1 of a component 2, which is shown cut open in FIG. 2. The securing device is a cylindrical sleeve 3 which is injection molded integrally from plastic and has four inwardly protruding holding elements 4 in the form of inward arches on the inner wall 5. The screw is plugged in a known manner into the bore of the cylindrical sleeve 3 and is held in a force-fitting manner by the holding elements 4.

Figure 3:
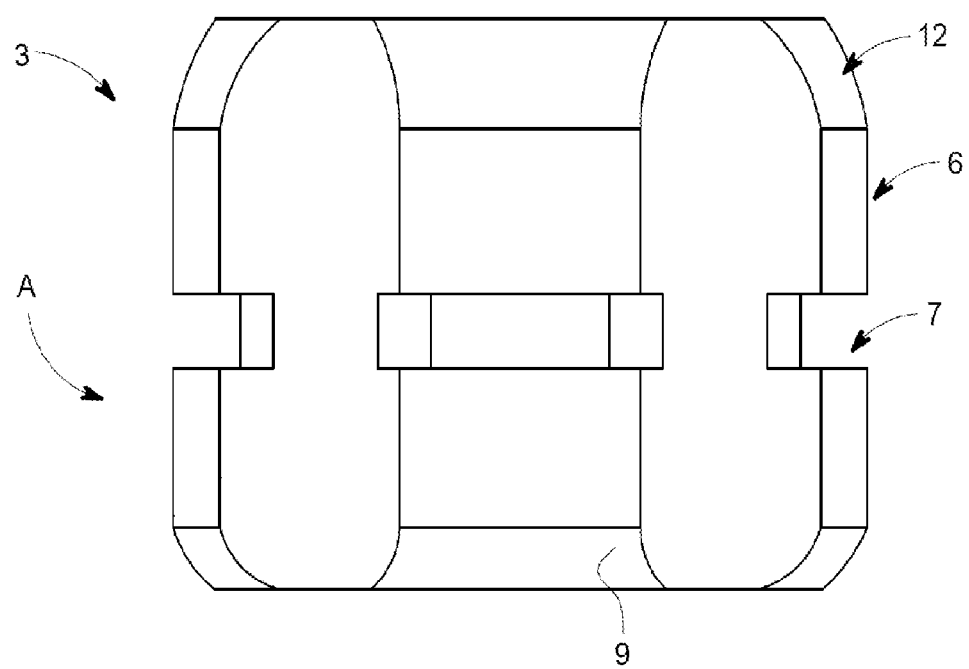
FIG. 3 shows a sleeve comprising and an inner side and an outer wall which is flat when viewed from a direction which is perpendicular to an axial direction of the sleeve.

According to the present invention, the cylindrical sleeve 3 has a recess 7 in its outer wall 6 for the latching engagement of an annular lug 8 (FIG. 2) which is located in the through-opening 1. The latching-in operation takes place during the plugging-in of the sleeve into the through-bore 1 in the course of the pre-assembly. In the shown exemplary embodiment, the cylindrical sleeve 3 has a contour in the shape of a cylinder jacket. The recess 7 is accordingly introduced into the outer wall 6 of the cylindrical sleeve 3 in the circumferential direction (arrow A). The outer wall 6 is flat when viewed from a direction which is perpendicular to an axial direction of the sleeve 3 (see FIG. 3).

As is apparent, the concave inward arches of the outer wall 6 form the inwardly protruding holding elements 4, wherein four outward arches 9 correspondingly remain in the outer wall 6, the outer surfaces of the outward arches lying against the inner wall 10 of the through-bore 1. In order to provide that the cylindrical sleeve 3 is stably supported in the through-bore 1 and the screw is reliably fixed in the cylindrical sleeve 3, the inward arches and the outward arches 9 run over the entire height of the cylindrical sleeve 3.

As shown in the drawings, the structures of the cylindrical sleeve 3, namely, the inward arches and the outward arches 9, have rotational symmetry at a division of 90°. The recess 7 is formed here by a slot in the material of the four outward arches 9, the slot encircling on an imaginary circumference of the cylindrical sleeve 3, wherein the slot traverses the outward arches 9 and is consequently continuous. The slot is not, however, of such a depth that it affects the material of the inward arches. The slot also runs at medium height and visually divides the cylindrical sleeve 3 into two equal parts. The slot therefore lies in the plane of symmetry of the sleeve which can be plugged in both orientations into the through-opening.

The surfaces which arise on the outer wall by the concave inward arches are provided with an identifying label 11, here "HONSEL" and "HPF".

In order to provide that the cylindrical sleeve 3 is plugged simply and securely into the through-bore, a bevel 12 is formed at each of the two ends of the cylindrical sleeve 3. The through-bore also has a bevel 13.

The system comprising the securing device, which is in the form of a cylindrical sleeve 3, and the component 2 with a through-bore 1, is apparent in FIG. 2, with the component 2 being produced by casting. During the production of the component 2, the through-bore 1 is formed by two core pullers which, as they are being removed from the mold, leave behind an annular lug 8 in the through-bore 1. The geometry and the position of the annular lug 8 is determined by the abutting surfaces and the arrangement of the core pullers and can be correspondingly defined. The annular lug 8 in the present case is located in the center of the through-bore 1. The annular lug 8 is formed so that it latches into the recess 7 located in the outer wall of the sleeve when the cylindrical sleeve 3 is plugged into the through-bore 1.

Figure 4:
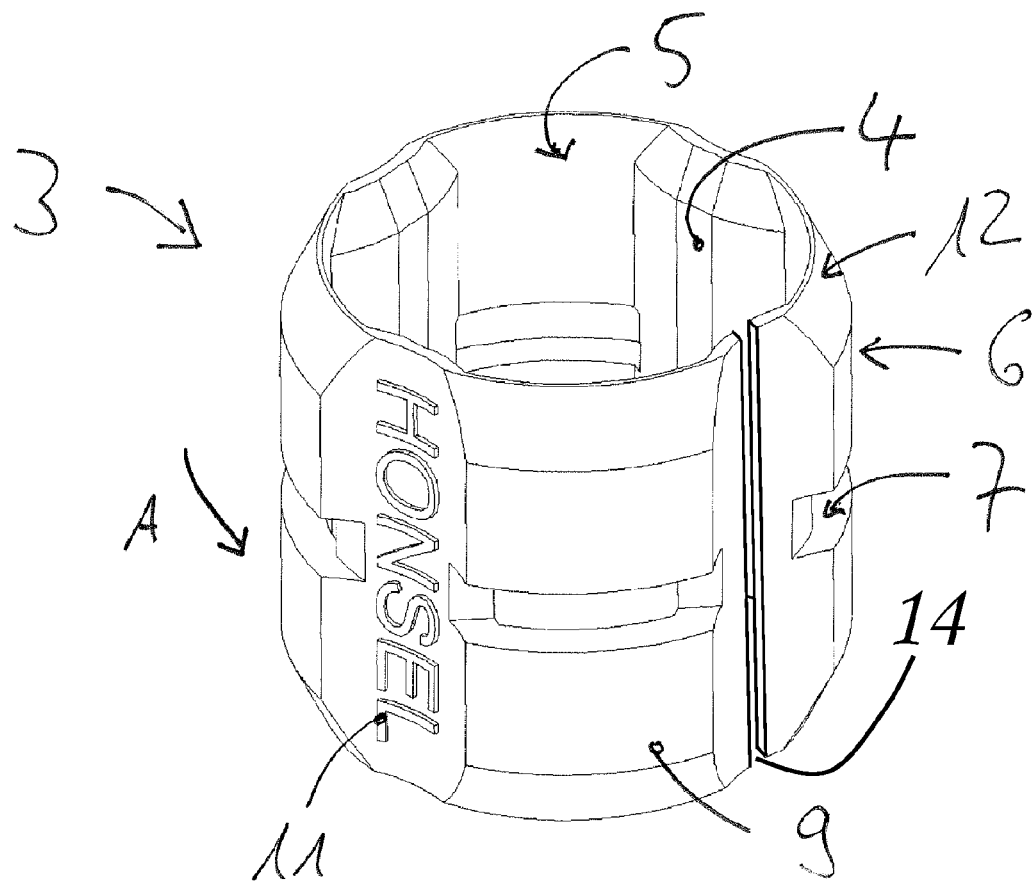
FIG. 4 shows a sleeve with a slit in the wall from one end to the other so that the diameter of the sleeve can be somewhat reduced in the event of pressure from the outside.

FIG. 4 shows that a slit 14 can be provided which runs in the axial direction of the sleeve 3. The slit 14 reduces the diameter of the sleeve 3 somewhat in the event of pressure from the outside, thereby increasing the flexibility resulting from the shape of the sleeve 3, which further simplifies the clipping into the through-bore.

The present invention is not limited to embodiments described herein; reference should be had to the appended claims.

What is claimed is:

1. A securing device for a pre-assembly of a pin-shaped connecting element in a through-opening of a component, the securing device comprising:
   a sleeve comprising an inner side and an outer wall which is flat when viewed from a direction which is perpendicular to an axial direction of the sleeve, the outer wall comprising a recess arranged therein, outward arches, and concave inward arches; and
   a plurality of holding elements each of which are configured to be inwardly protruding, the plurality of holding elements being arranged on the inner side of the sleeve, wherein,
   the recess arranged into the outer wall of the sleeve is configured to provide a latching engagement of a lug which is arranged in the through-opening during the pre-assembly,
   the sleeve is shaped as a cylinder jacket,
   the recess is introduced into the outer wall in a circumferential direction,
   the recess is formed by a slot which is arranged to only traverse the outward arches and to miss the concave inward arches,
   the sleeve is symmetrical with respect to the recess, and
   the concave inward arches of the sleeve form the inwardly protruding holding elements.

2. The securing device as recited in claim 1, wherein the outward arches and the concave inward arches run over an entire height of the sleeve.

3. The securing device as recited in claim 1, wherein the recess is formed by the slot which is continuous.

4. The securing device as recited in claim 1, wherein the slot runs at a medium height and visually divides the sleeve into two identical parts.

5. The securing device as recited in claim 1, wherein the outward arches and the concave inward arches are each arranged symmetrically around a circumference of the sleeve.

6. The securing device as recited in claim 5, wherein the outward arches and the concave inward arches are each arranged symmetrically at a division of 90° around the circumference of the sleeve.

7. The securing device as recited in claim 1, wherein the sleeve further comprises a bevel formed at each end thereof.

8. The securing device as recited in claim 1, wherein the sleeve is injection molded integrally from a plastic.

9. The securing device as recited in claim 1, wherein the outer wall of the sleeve is interrupted from one end to another end by a slit.

10. The securing device as recited in claim 9, wherein the slit runs in the axial direction of the sleeve.

11. A system consisting of:
   the securing device as recited in claim 1; and
   the component comprising a through-opening,
   wherein, the component is produced in an injection molding process or in a casting process, the through-opening is formed by two core pullers which, as they are being removed from the mold, leave behind an annular lug in the through-opening, and the annular lug is configured to latch into the recess located in the outer wall of the sleeve.

12. The system as recited in claim 11, wherein the annular lug is arranged in a center of the through-opening.

13. The system as recited in claim 11, wherein the through-opening comprises a bevel which is integrally formed on an edge thereof.

\* \* \* \* \*